(12) United States Patent
Ueno (10) Patent No.: US 11,794,528 B2
(45) Date of Patent: Oct. 24, 2023

(54) PNEUMATIC TIRE AND TIRE MOLD (71) Applicant: Toyo Tire Corporation, Itami (JP)

(72) Inventor: Tomonori Ueno, Itami (JP)

(73) Assignee: Toyo Tire Corporation, Itami (JP)

( * ) Notice: Subject to any disclaimer, the term of this patent is extended or adjusted under 35 U.S.C. 154(b) by 302 days.

(21) Appl. No.: 17/065,649

(22) Filed: Oct. 8, 2020

(65) Prior Publication Data

US 2021/0155057 A1    May 27, 2021

(30) Foreign Application Priority Data

Nov. 26, 2019   (JP) .................. 2019-213337

(51) Int. Cl.
*B60C 13/02*   (2006.01)
*B29D 30/06*   (2006.01)

(52) U.S. Cl.
CPC .......... *B60C 13/02* (2013.01); *B29D 30/0606* (2013.01); *B29D 2030/0612* (2013.01)

(58) Field of Classification Search
CPC ................ B60C 13/02; B29D 30/0606; B29D 2030/0612
USPC ........................................ 152/523; 156/130.7
See application file for complete search history.

(56) References Cited

U.S. PATENT DOCUMENTS

2018/0178467 A1    6/2018  Ando
2021/0086561 A1*   3/2021  Yoshida ................ B60C 13/002

FOREIGN PATENT DOCUMENTS

| JP | H11-34060 A    | 2/1999    |
|----|----------------|-----------|
| JP | 2014-159178 A  | 9/2014    |
| JP | 2017209958 A   | * 11/2017 |
| JP | 2018-103517 A  | 7/2018    |

OTHER PUBLICATIONS

Eguchi S, JP-2017209958-A, machine translation. (Year: 2017).*
Office Action dated Jun. 27, 2023, issued in counterpart JP application No. 2019-213337, with English translation. (8 pages).

* cited by examiner

*Primary Examiner* — Robert C Dye
*Assistant Examiner* — Sedef E Paquette
(74) *Attorney, Agent, or Firm* — WHDA, LLP (57) ABSTRACT

In a pneumatic tire, a sidewall region comprises a protruding portion that protrudes in a tire width direction from a base surface, the protruding portion comprises an apical surface which is arranged at an end toward an exterior in the tire width direction, at least one side surface that is respectively contiguous with the base surface and the apical surface, a first linear projection which protrudes at a boundary between the apical surface and the at least one side surface, a second linear projection which protrudes at a boundary between the basal surface and the at least one side surface, and a third linear projection which protrudes in such fashion that a first end of the third linear projection is contiguous with the first linear projection, and a second end of the third linear projection is contiguous with the second linear projection.

10 Claims, 6 Drawing Sheets

PNEUMATIC TIRE AND TIRE MOLD

CROSS REFERENCE TO RELATED APPLICATIONS

This application claims the benefit of priority of Japanese application no. 2019-213337, filed on Nov. 26, 2019, which is incorporated herein by reference.

BACKGROUND OF THE INVENTION

Field of the Invention

The present disclosure relates to a pneumatic tire and a tire mold.

Description of the Related Art

Conventionally a tire mold might, for example, comprise a sidewall mold region for molding a sidewall region, the sidewall mold region comprising a concavity that is recessed relative to a basal surface (e.g., JP 2018-103517A).

The concavity might comprise a bottom surface arranged at the bottom, a side surface that is respectively contiguous with the basal surface and the bottom surface, a first groove that is recessed at a boundary between the bottom surface and the side surface, and a second groove that is recessed at a boundary between the basal surface and the bottom surface.

It so happens that while it is possible with the tire mold associated with JP 2018-103517A to suppress retention of air at the boundary between the bottom surface and the side surface, and at the boundary between the basal surface and the side surface, there are circumstances in which air is retained between the first groove and the second groove.

Where this is the case, there will be formation of a region of thinned material at the protruding portion of the sidewall region.

SUMMARY OF THE INVENTION

It is an object of the present disclosure to provide a pneumatic tire that will make it possible to suppress formation of a region of thinned material at the protruding portion of the sidewall region.

There is provided a pneumatic tire comprises:
a sidewall region extending in a tire radial direction;
wherein the sidewall region comprises a protruding portion that protrudes in a tire width direction from a base surface;
wherein the protruding portion comprises
an apical surface which is arranged at an end toward an exterior in the tire width direction;
at least one side surface that is respectively contiguous with the base surface and the apical surface;
a first linear projection which protrudes at a boundary between the apical surface and the at least one side surface;
a second linear projection which protrudes at a boundary between the basal surface and the at least one side surface; and
a third linear projection which protrudes in such fashion that a first end of the third linear projection is contiguous with the first linear projection, and a second end of the third linear projection is contiguous with the second linear projection.

DETAILED DESCRIPTION OF THE INVENTION

Below, an embodiment of a pneumatic tire and a tire mold is described with reference to FIG. 1 through FIG. 7. At the respective drawings (and the same is true for FIGS. 8 and 9), note that dimensional ratios at the drawings and actual dimensional ratios are not necessarily consistent, and note further that dimensional ratios are not necessarily consistent from drawing to drawing.

Figure 1:
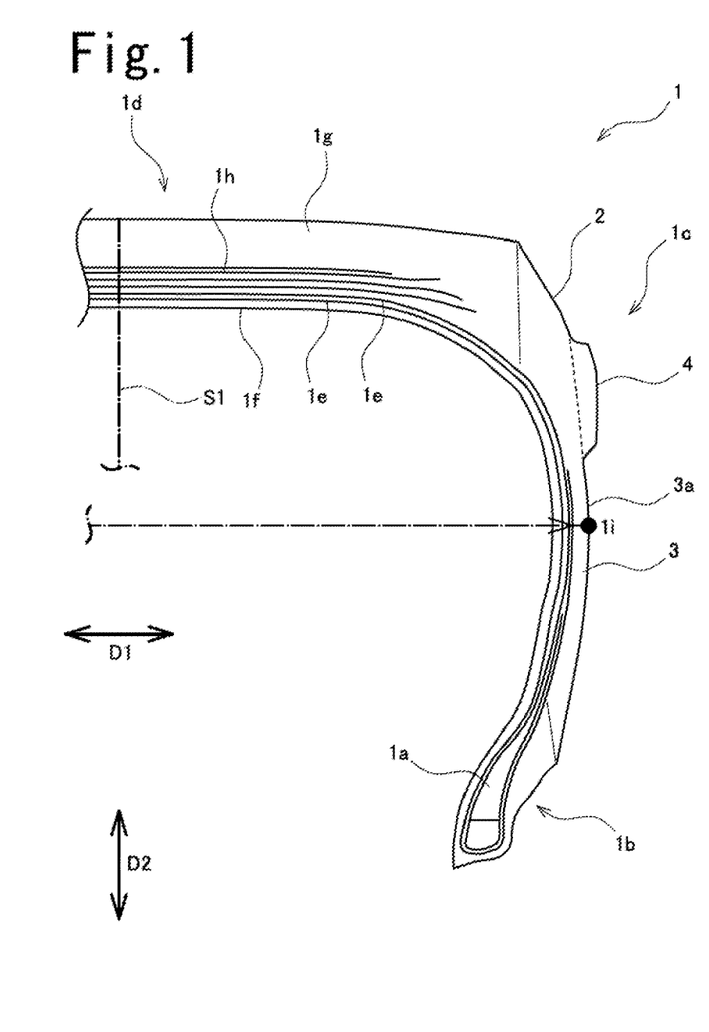
FIG. 1 is a view of a section, taken along a tire meridional plane, of the principal components in a pneumatic tire associated with an embodiment.
Figure 2:
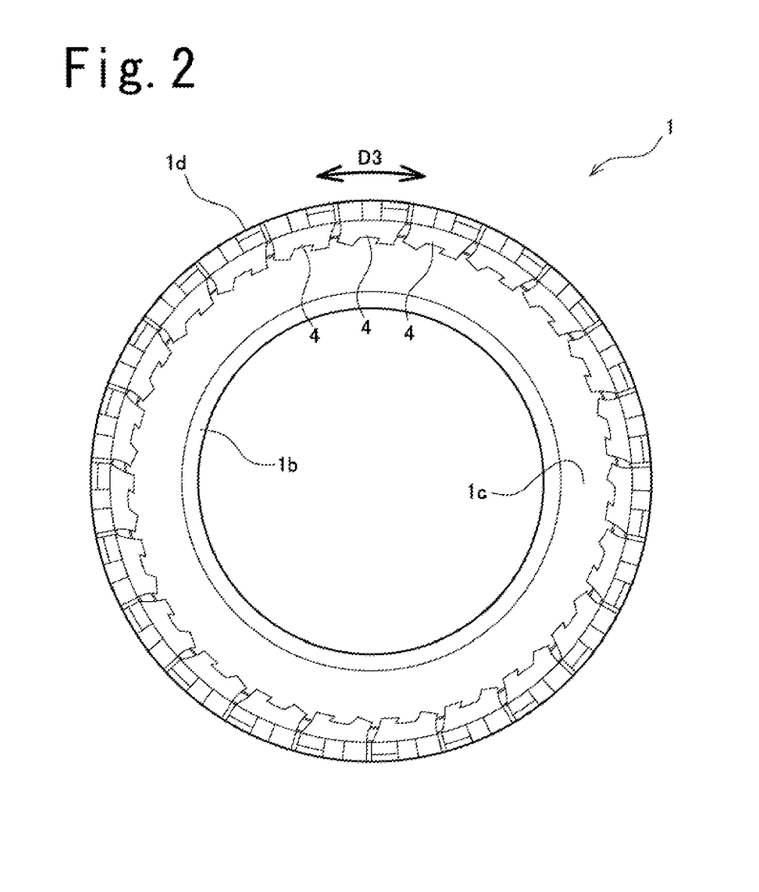
FIG. 2 is a full side view of a pneumatic tire associated with same embodiment.

As shown in FIG. 1 and FIG. 2, tire 1 comprises a pair (only one of which is shown in FIG. 1 and FIG. 2) of bead regions $1b$ at which beads $1a$ are present; a pair (only one of which is shown in FIG. 1 and FIG. 2) of sidewall regions is which extend outwardly in the tire radial direction D2 from the respective bead regions $1b$; and tread region $1d$ which is contiguous with the outer ends in the tire radial direction D2 of the pair of sidewall regions $1c$. Note that tire 1 may be mounted on a rim (not shown).

At the respective drawings, first direction D1 is the tire width direction D1 which is parallel to the tire rotational axis that is the center of rotation of tire 1, second direction D2 is the tire radial direction D2 which is the direction of the diameter of tire 1, and third direction D3 is the tire circumferential direction D3 which is circumferential with respect to the rotational axis of the tire. Furthermore, tire equatorial plane S1 refers to a plane that is located centrally in the tire width direction D1 of tire 1 and that is perpendicular to the rotational axis of the tire; tire meridional planes refer to planes that are perpendicular to tire equatorial plane S1 and that contain the rotational axis of the tire.

Tire 1 comprises carcass layer $1e$ which spans the pair of beads $1a$, and innerliner layer $1f$ which is arranged at a location toward the interior from carcass layer $1e$ and which has superior functionality in terms of its ability to impede passage of gas therethrough so as to permit air pressure to be maintained. Carcass layer $1e$ and innerliner layer $1f$ are arranged in parallel fashion with respect to the inner circumferential surface of the tire over a portion thereof that encompasses bead regions $1b$, sidewall regions $1c$, and tread region $1d$.

To constitute the tire outer surface, sidewall region 1c comprises sidewall rubber 2 which is arranged toward the exterior in the tire width direction D1 from carcass layer 1e. Furthermore, to constitute the tread surface (contact patch) which comes in contact with the ground, tread region 1d comprises tread rubber 1g which is arranged at the outer circumferential surface side of carcass layer 1e, and belt layer 1h which is arranged between carcass layer 1e and tread rubber 1g.

Sidewall regions 1c are such that provided at the outer surface thereof are locations 1i which are at the same locations in the tire radial direction D2 as the locations at which tire width is a maximum (more specifically, the locations at which distance between respective exterior points in the tire width direction D1 of carcass layer 1e is a maximum). Below, these locations 1i are referred to as tire maximum width locations 1i.

Sidewall rubber 2 is provided with base region 3, and protruding portion 4 which protrudes from base region 3. Disposed at the surface of base region 3 is basal surface 3a, i.e., the profile surface (at FIG. 1 (and the same is true for FIG. 4 and FIG. 9), the portion contiguous with protruding portion 4 is shown in broken line), protruding portion 4 protruding toward the exterior in the tire width direction D1 from basal surface 3a.

Protruding region 4 is arranged at least at the exterior in the tire radial direction D2 of sidewall region 1c. More specifically, at least a portion of protruding region 4 is arranged toward the exterior in the tire radial direction D2 from tire maximum width location 1i of sidewall region 1c.

As a result, under muddy and/or sandy conditions, when the weight of the vehicle causes tire 1 to sink such that it is buried under mud and/or sand, protruding region 4 is able to come in contact with the ground; and under rocky conditions, protruding region 4 is able to come in contact with irregular surfaces of rocks. That is, protruding region 4 comes in contact with the ground under bad road conditions such as when the terrain is muddy, sandy, and/or rocky. Note that protruding region 4 does not come in contact with the ground during normal travel on a flat road.

In addition, a plurality of protruding portions 4 are arrayed along the tire circumferential direction D3. Furthermore, sidewall rubber 2 comprises a plurality of annular projections 5 arrayed along the tire circumferential direction D3 in such fashion as to mutually connect protruding portions 4, 4.

Figure 3:
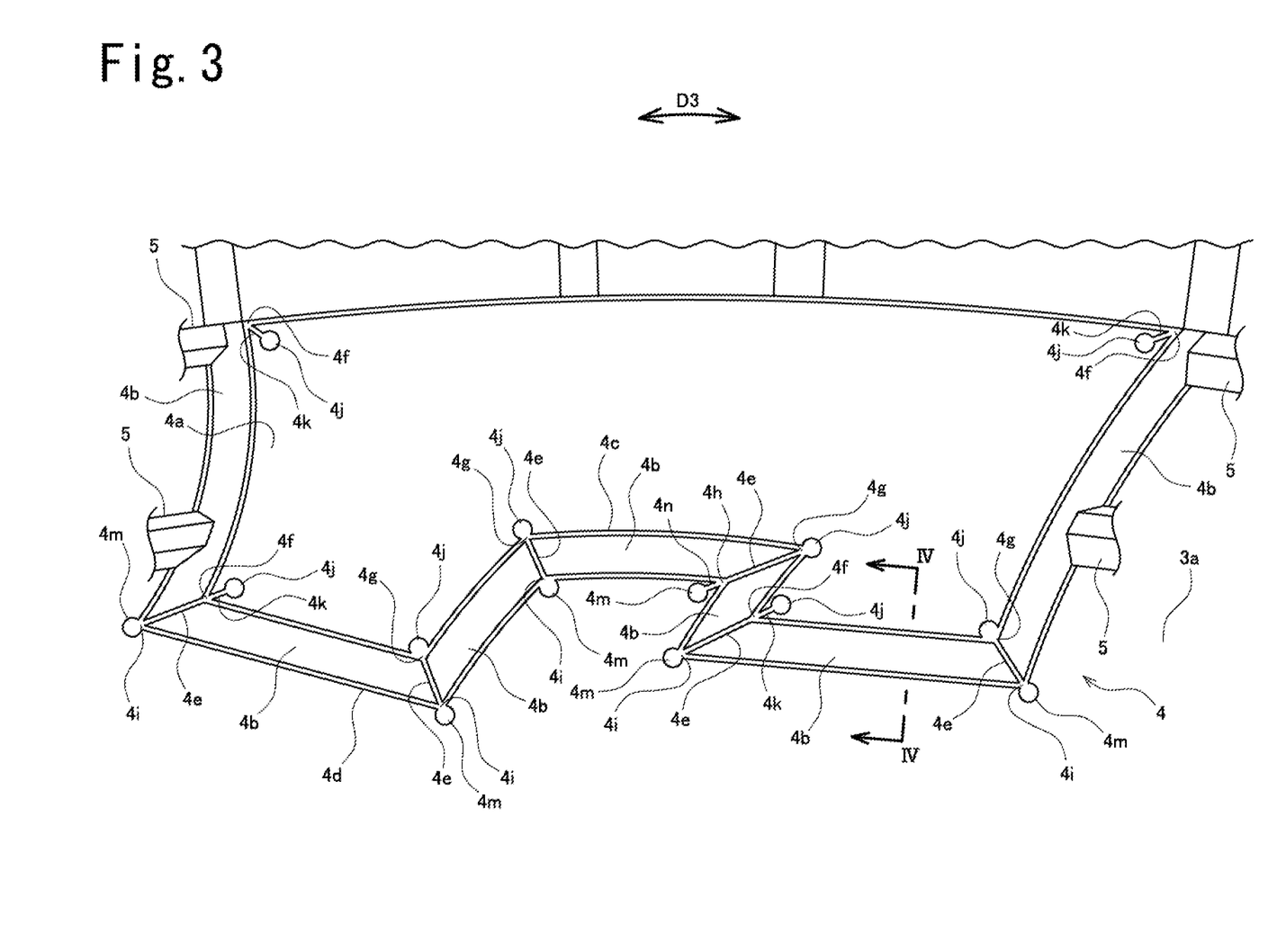
FIG. 3 is an enlarged side view of the principal components of a pneumatic tire associated with same embodiment.
Figure 4:
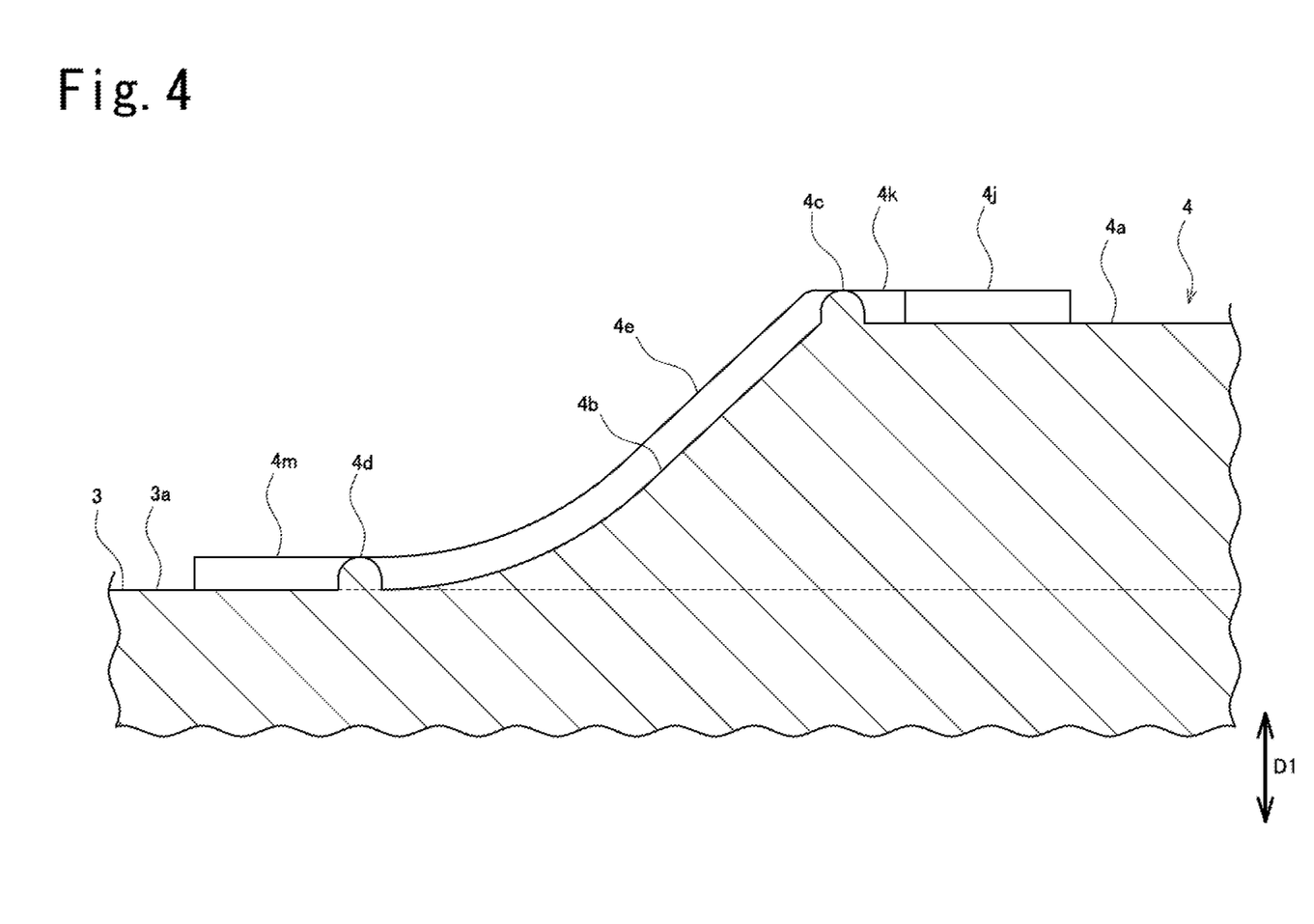
FIG. 4 is an enlarged view of a section taken along IV-IV in FIG. 3.

As shown in FIG. 3 and FIG. 4, protruding portion 4 comprises apical surface 4a which is arranged at the end toward the exterior in the tire width direction D1, and a plurality of side surfaces 4b, adjacent pairs of which are contiguous with each other, and each of which is respectively contiguous with basal surface 3a and apical surface 4a. Furthermore, protruding region 4 comprises first linear projection 4c which protrudes at the boundary between apical surface 4a and side surface 4b; second linear projection 4d which protrudes at the boundary between basal surface 3a and side surface 4b; and a plurality of third linear projections 4e, each of which protrudes in such fashion as to respectively be contiguous with first linear projection 4c and second linear projection 4d.

While there is no particular limitation with respect thereto, apical surface 4a and side surface 4b are respectively formed so as to be planar. Furthermore, while there is no particular limitation with respect thereto, widths of first through third linear projections 4c through 4e might, for example, be 1.0 mm to 1.5 mm; and heights by which first through third linear projections 4c through 4e protrude from respective surfaces 4a, 3a, and 4b might, for example, be 1.0 mm to 1.5 mm.

Note that first linear projection 4c might, for example, be provided at the entire boundary between apical surface 4a and side surface(s) 4b; or it might, for example, be provided at portion(s) thereof. Furthermore, second linear projection 4d might, for example, be provided at the entire boundary between basal surface 3a and side surface(s) 4b; or it might, for example, be provided at portion(s) thereof. Furthermore, while there is no particular limitation with respect thereto, in accordance with the present embodiment, linear projections 4c, 4d might, for example, be formed so as to be of semicircular cross-section, the width of which decreases as one proceeds toward the tip.

First linear projection 4c comprises a plurality of first corners 4f, 4g formed in angular fashion; and second linear projection 4d comprises a plurality of second corners 4h, 4i formed in angular fashion. In addition, third linear projections 4e protrude at boundaries between pairs of side surfaces 4b, 4b so as to respectively be contiguous with first corners 4f, 4g and second corners 4h, 4i.

Note that third linear projection 4e might, for example, be provided at the entire boundary between a pair of side surfaces 4b, 4b; or it might, for example, be provided at portion(s) thereof. Furthermore, first corners 4f, 4g include acute first corners 4f which form acute angles, and obtuse first corners 4g which form obtuse angles; and second corners 4h, 4i include acute second corners 4h which form acute angles, and obtuse second corners 4i which form obtuse angles.

Protruding region 4 comprises a plurality of first convexities 4j which protrude from apical surface 4a, and further comprises fourth linear projection 4k which protrudes so as to respectively be contiguous with first convexity 4j and acute first corner 4f. In addition, fourth linear projection 4k extends in such fashion that together with third linear projection 4e it forms what appears to be a straight line as viewed in the tire width direction D1. Note that while obtuse first corner 4g is contiguous with first convexity 4j in such fashion that no fourth linear projection 4k intervenes therebetween, it may be connected to first convexity 4j by way of a fourth linear projection 4k.

Protruding region 4 comprises a plurality of second convexities 4m which protrude from basal surface 3a, and further comprises fifth linear projection 4n which protrudes so as to respectively be contiguous with second convexity 4m and acute second corner 4h. In addition, fifth linear projection 4n extends in such fashion that together with third linear projection 4e it forms what appears to be a straight line as viewed in the tire width direction D1. Note that while obtuse second corner 4i is contiguous with second convexity 4m in such fashion that no fifth linear projection 4n intervenes therebetween, it may be connected to second convexity 4m by way of a fifth linear projection 4n.

Note that convexities 4j, 4m might, for example, be provided at all corners 4f through 4i; or these might, for example, be provided at a portion of corners 4f through 4i. Furthermore, while there is no particular limitation with respect thereto, first and second convexities 4j, 4m are formed so as to be cylindrical in the present embodiment.

While there is no particular limitation with respect thereto, diameters of first and second convexities 4j, 4m might, for example, be 1.5 mm to 3.0 mm; and heights by which first and second convexities 4j, 4m protrude from respective surfaces 4a, 3a might, for example, be 0.1 mm to 2.5 mm. Furthermore, while there is no particular limitation with respect thereto, widths of fourth and fifth linear projections 4k, 4n might, for example, be 0.5 mm to 1.5 mm; and heights by which fourth and fifth linear projections 4k, 4n protrude from respective surfaces 4a, 3a might, for example, be 0.5 mm to 1.5 mm.

Next, a tire mold will be described with reference to FIG. 5 through FIG. 7.

Figure 5:
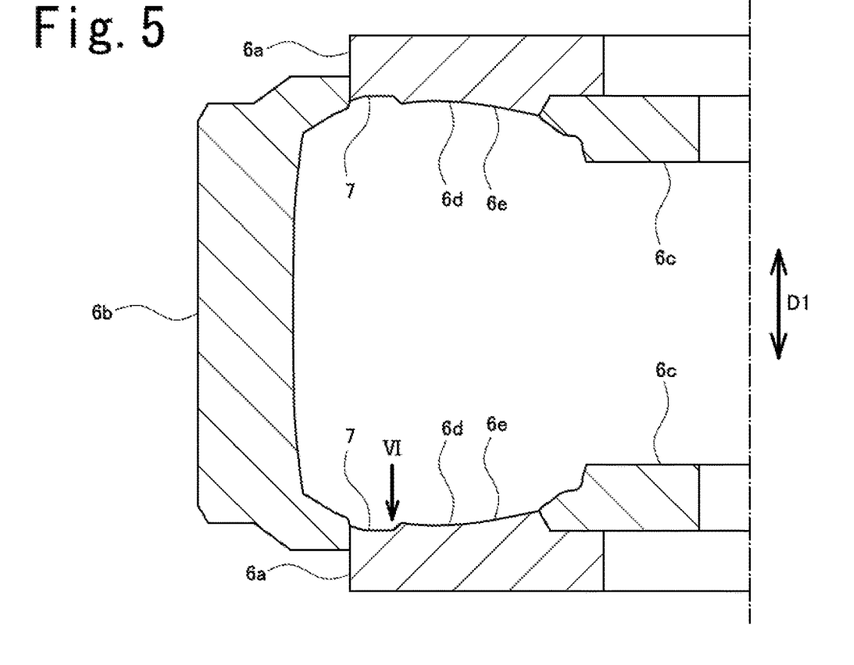
FIG. 5 is a sectional view of the principal components of a tire manufacturing device associated with same embodiment.

As shown in FIG. 5, a plurality of tire molds 6a are provided at tire vulcanizing device. More specifically, a tire vulcanizing device comprises a pair of side molds 6a that come in contact with sidewall regions 1c of tire 1; a plurality of tread molds 6b that come in contact with tread region 1d of tire 1; and a pair of bead molds 6c with which the bead regions 1b of tire 1 engage.

The pair of side molds 6a are arranged in mutually opposed fashion in the tire width direction D1, and the plurality of tread molds 6b are arranged so as to be arrayed along the tire circumferential direction D3. Note that the directions (the tire width direction D1, tire radial direction D2, and tire circumferential direction D3) pertaining to the tire 1 which is obtained by molding using the tire vulcanizing device are employed for directions D1 through D3 at tire mold 6a through 6c.

Side mold 6a comprises sidewall mold region 6d for molding sidewall region 1c by coming in contact with sidewall region 1c. Sidewall mold region 6d comprises concavity 7 that is recessed relative to basal surface 6e, i.e., the profile surface, for molding protruding portion 4.

Figure 6:
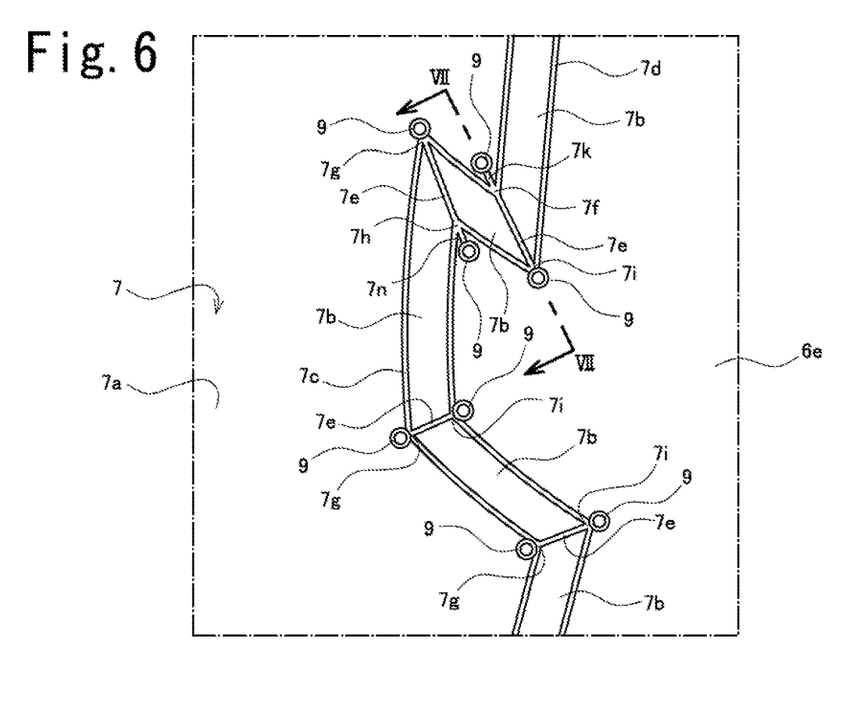
FIG. 6 is a drawing of principal components as viewed in the direction of arrow VI (tire width direction) in FIG. 5.
Figure 7:
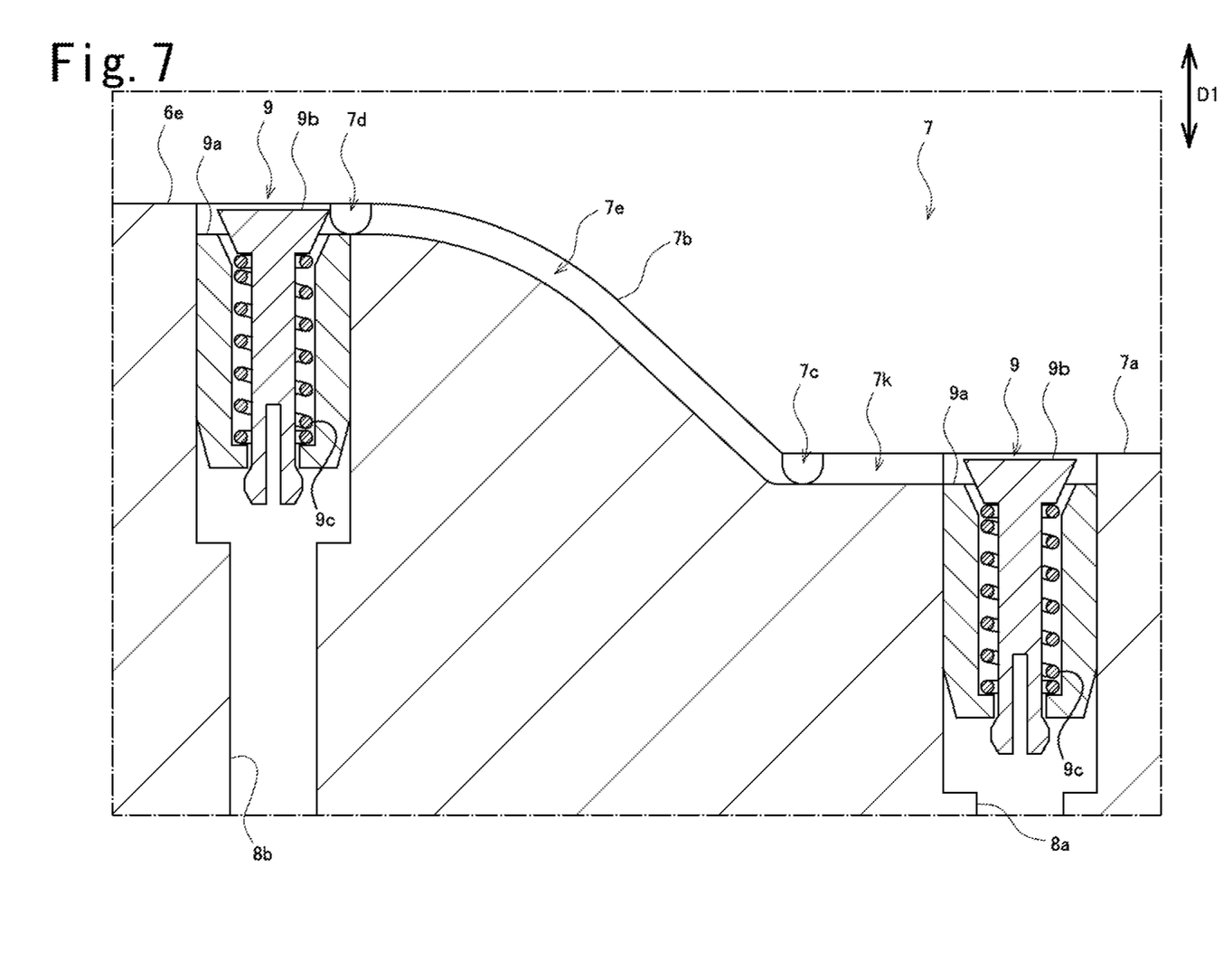
FIG. 7 is an enlarged view of a section taken along VII-VII in FIG. 6.

As shown in FIG. 6 and FIG. 7, concavity 7 comprises bottom surface 7a arranged at the bottom, and further comprises a plurality of side surfaces 7b, adjacent pairs of which are contiguous with each other, and each of which is respectively contiguous with basal surface 6e and bottom surface 7a. Furthermore, concavity 7 comprises first groove 7c which constitutes a recess at the boundary between bottom surface 7a and side surface 7b; second groove 7d which constitutes a recess at the boundary between basal surface 6e and side surface 7b; and third groove 7e which constitutes a recess that is respectively contiguous with first groove 7c and second groove 7d.

While there is no particular limitation with respect thereto, bottom surface 7a and side surface 7b are respectively formed so as to be planar. Furthermore, while there is no particular limitation with respect thereto, widths of first through third grooves 7c through 7e might, for example, be 1.0 mm to 1.5 mm; and depths by which first through third grooves 7c through 7e are recessed relative to respective surfaces 7a, 6e, and 7b might, for example, be 1.0 mm to 1.5 mm.

Note that first groove 7c might, for example, be provided at the entire boundary between bottom surface 7a and side surface(s) 7b; or it might, for example, be provided at portion(s) thereof. Furthermore, second groove 7d might, for example, be provided at the entire boundary between basal surface 6e and side surface(s) 7b; or it might, for example, be provided at portion(s) thereof. Furthermore, while there is no particular limitation with respect thereto, in accordance with the present embodiment, grooves 7c, 7d might, for example, be formed so as to be cavities of semicircular cross-section, the widths of which decrease as one proceeds toward the bottom.

First groove 7c comprises a plurality of first corners 7f, 7g formed in angular fashion; and second groove 7d comprises a plurality of second corners 7h, 7i formed in angular fashion. In addition, third grooves 7e constitute recesses at boundaries between pairs of side surfaces 7b, 7b so as to respectively be contiguous with first corners 7f, 7g and second corners 7h, 7i.

Note that third groove 7e might, for example, be provided at the entire boundary between a pair of side surfaces 7b, 7b; or it might, for example, be provided at portion(s) thereof. Furthermore, first corners 7f, 7g include acute first corners 7f which form acute angles, and obtuse first corners 7g which form obtuse angles; and second corners 7h, 7i include acute second corners 7h which form acute angles, and obtuse second corners 7i which form obtuse angles.

Side mold 6a comprises a plurality of first vent holes 8a which are provided at bottom surface 7a, and concavity 7 comprises fourth groove 7k which is recessed in such fashion as to be respectively contiguous with first vent hole 8a and acute first corner 7f. In addition, fourth groove 7k extends in such fashion that together with third groove 7e it forms what appears to be a straight line as viewed in the tire width direction D1. Note that while obtuse first corner 7g is contiguous with first vent hole 8a in such fashion that no fourth groove 7k intervenes therebetween, it may be connected to first vent hole 8a by way of a fourth groove 7k.

Side mold 6a comprises a plurality of second vent holes 8b which are provided at basal surface 6e, and concavity 7 comprises fifth groove 7n which is recessed in such fashion as to be respectively contiguous with second vent hole 8b and acute second corner 7h. In addition, fifth groove 7n extends in such fashion that together with third groove 7e it forms what appears to be a straight line as viewed in the tire width direction D1. Note that while obtuse second corner 7i is contiguous with second vent hole 8b in such fashion that no fifth groove 7n intervenes therebetween, it may be connected to second vent hole 8b by way of a fifth groove 7n.

Note that vent holes 8a, 8b might, for example, be provided at all corners 7f through 7i; or these might, for example, be provided at a portion of corners 7f through 7i. Furthermore, while there is no particular limitation with respect thereto, widths of fourth and fifth grooves 7k, 7n might, for example, be 0.5 mm to 1.5 mm; and depths by which fourth and fifth grooves 7k, 7n are recessed relative to respective surfaces 7a, 6e might, for example, be 0.5 mm to 1.5 mm.

Vent holes 8a, 8b cause the interior and the exterior of side mold 6a to be in mutual communication. In addition, side mold 6a is provided with shutoff valves 9 that open and close vent holes 8a, 8b. Shutoff valve 9 comprises valve seat 9a having a hole at the interior thereof which allows passage of gas therethrough; a valve body 9b capable of being moved between a closed position at which the hole is closed, and an open position at which the hole is opened; and a force applying portion 9c that applies a force to valve body 9b such as will tend to cause valve body 9b to move from the closed position toward the open position.

At shutoff valve 9, the force exerted on valve body 9b from force applying portion 9c causes valve body 9b to normally be located in the open position at which the hole of valve seat 9a is open. However, as vulcanization of tire 1 proceeds and the rubber approaches vent holes 8a, 8b, this causes the pressure within tire mold 6a to decrease and the rubber to come in contact with valve body 9b. In accompaniment thereto, valve body 9b overcomes the force from force applying portion 9c and moves, causing valve body 9b to be located at the closed position at which the hole of valve seat 9a is closed. In this way, shutoff valves 9 open and close vent holes 8a, 8b.

Such side mold 6a will make it possible for concavity 7 to mold protruding portion 4. More specifically, bottom surface 7a molds apical surface 4a; side surface 7b molds side surface 4b; first through fifth grooves 7c through 7e and 7k and 7n respectively mold first through fifth linear projections 4c through 4e and 4k and 4n; and first and second vent holes 8a and 8b mold first and second convexities 4j and 4m.

As described above, the tire mold 6a of the embodiment includes:
a sidewall mold region 6d that molds a sidewall region 1c;
wherein the sidewall mold region 6d comprises a concavity 7 that is recessed relative to a basal surface 6e; and
wherein the concavity 7 comprises
a bottom surface 7a arranged at a bottom;
at least one side surface 7b that is respectively contiguous with the basal surface 6e and the bottom surface 7a;
a first groove 7c which constitutes a recess at a boundary between the bottom surface 7a and the at least one side surface 7b;
a second groove 7d which constitutes a recess at a boundary between the basal surface 6e and the at least one side surface 7b; and
a third groove 7e which is recessed so as to cause a first end of the third groove 7e to be contiguous with the first groove 7c, and so as to cause a second end of the third groove 7e to be contiguous with the second groove 7d.

In accordance with such constitution, air present at side surface 7b, i.e., air present between first groove 7c and second groove 7d, will be guided away by third groove 7e. This will make it possible to suppress retention of air at concavity 7 of sidewall mold region 6d.

At the pneumatic tire 1 which is obtained by molding using such tire mold 6a, note that the pneumatic tire 1 comprises
a sidewall region 1c extending in a tire radial direction D2;
wherein the sidewall region 1c comprises a protruding portion 4 that protrudes in a tire width direction D1 from a base surface 3a;
wherein the protruding portion 4 comprises
an apical surface 4a which is arranged at an end toward an exterior in the tire width direction D1;
at least one side surface 4b that is respectively contiguous with the base surface 3a and the apical surface 4a;
a first linear projection 4c which protrudes at a boundary between the apical surface 4a and the at least one side surface 4b;
a second linear projection 4d which protrudes at a boundary between the basal surface 3a and the at least one side surface 4b; and
a third linear projection 4e which protrudes in such fashion that a first end of the third linear projection 4e is contiguous with the first linear projection 4c, and a second end of the third linear projection 4e is contiguous with the second linear projection 4d.

In addition, such pneumatic tire 1 will also be a pneumatic tire 1 such that formation of a region of thinned material at protruding portion 4 of sidewall region 1c is suppressed.

Further, in the tire mold 6a of the embodiment,
wherein the first groove 7c comprises a first corner 7f, 7g formed in angular fashion;
the second groove 7d comprises a second corner 7h, 7i formed in angular fashion;
the at least one side surface 7b is at least one among a plurality of side surfaces, at least one adjacent pair of which 7b, 7b are mutually contiguous; and the third groove 7e is recessed at a boundary between the at least one adjacent pair of side surfaces 7b, 7b so as to cause the first end of the third groove 7e to be contiguous with the first corner 7f, 7g, and so as to cause the second end of the third groove 7e to be contiguous with the second corner 7h, 7i.

In accordance with such constitution, to address the fact that there is a tendency for air to be retained at first corners 7f, 7g and second corners 7h, 7i, third grooves 7e are respectively contiguous with first corners 7f, 7g and second corners 7h, 7i. This makes it possible to suppress retention of air at first corners 7f, 7g and second corners 7h, 7i.

At the pneumatic tire 1 which is obtained by molding using such tire mold 6a,
note that the first linear projection 4c comprises a first corner 4f, 4g formed in angular fashion;
the second linear projection 4d comprises a second corner 4h, 4i formed in angular fashion;
the at least one side surface 4b is at least one among a plurality of side surfaces 4b, 4b, at least one adjacent pair of which are mutually contiguous; and
the third linear projection 4e protrudes at a boundary between the at least one adjacent pair of side surfaces 4b, 4b so as to cause the first end of the third linear projection 4e to be contiguous with the first corner 4f, 4g, and so as to cause the second end of the third linear projection 4e to be contiguous with the second corner 4h, 4i.

Further, the tire mold 6a of the embodiment further comprises a first vent hole 8a which is disposed at the bottom surface 7a and which causes an interior of the tire mold 6a to be put into communication with an exterior thereof;
wherein the concavity 7 comprises a fourth groove 7k that is recessed so as to cause a first end of the fourth groove 7k to be contiguous with the first vent hole 8a, and so as to cause a second end of the fourth groove 7k to be contiguous with the first corner 7f.

In accordance with such constitution, to address the fact that there is a tendency for air to be retained at first corners 7f, fourth grooves 7k are respectively contiguous with vent holes 8a and first corners 7f. Because this makes it possible for air at first corners 7f to be guided away by first vent holes 8a, this makes it possible to effectively suppress retention of air at first corners 7f.

At the pneumatic tire 1 which is obtained by molding using such tire mold 6a,
note that the protruding portion 4 comprises a first convexity 4j which protrudes from the apical surface 4a; and a fourth linear projection 4k which protrudes so as to cause a first end of the fourth linear projection 4k to be contiguous with the first convexity 4j, and so as to cause a second end of the fourth linear projection 4k to be contiguous with the first corner 4f.

Further, in the tire mold 6a of the embodiment,
wherein the fourth groove 7k extends so as to be collinear with the third groove 7e.

In accordance with such constitution, air guided away therefrom by third groove 7e is guided to vent hole 8a by way of fourth groove 7k. In addition, because third groove 7e and fourth groove 7k are collinear, air guided away therefrom by third groove 7e can be definitively guided to vent hole 8a by fourth groove 7k.

At the pneumatic tire 1 which is obtained by molding using such tire mold 6a,
note that the fourth linear projection 4k extends so as to be collinear with the third linear projection 4e.

Further, in the tire mold 6a of the embodiment, wherein the first corner 7f forms an acute angle.

In accordance with such constitution, to address the fact that there is a tendency for air to be retained at acute first corners 7f, fourth grooves 7k are respectively contiguous with vent holes 8a and first corners 7f. Because this makes it possible for air at first corners 7f to be guided away by first vent holes 8a, this makes it possible to effectively suppress retention of air at first corners 7f.

At the pneumatic tire 1 which is obtained by molding using such tire mold 6a, note that the first corner 4f forms an acute angle.

The tire pneumatic tire 1 and the tire mold 6a are not limited to the configuration of the embodiment described above, and the effects are not limited to those described above. It goes without saying that the t pneumatic tire 1 and the tire mold 6a can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1-1) The constitution of pneumatic tire 1 associated with the foregoing embodiment is such that first and second linear projections 4c, 4d respectively comprise corners 4f through 4i, and is such that a plurality of side surfaces 4b are provided. However, pneumatic tire 1 is not limited to such constitution. For example, it is also possible to adopt a constitution in which first and second linear projections 4c, 4d do not respectively comprise corners 4f through 4i, and in which one side surface 4b is provided.

(1-2) The constitution of tire mold 6a associated with the foregoing embodiment is such that first and second grooves 7c, 7d respectively comprise corners 7f through 7i, and is such that a plurality of side surfaces 7b are provided. However, tire mold 6a is not limited to such constitution. For example, it is also possible to adopt a constitution in which first and second grooves 7c, 7d do not respectively comprise corners 7f through 7i, and in which one side surface 7b is provided.

(2-1) Furthermore, the constitution of pneumatic tire 1 associated with the foregoing embodiment is such that third linear projections 4e protrude at boundaries between pairs of side surfaces 4b, 4b. However, pneumatic tire 1 is not limited to such constitution. For example, it is also possible to adopt a constitution in which third linear projections 4e protrude at locations other than boundaries between pairs of side surfaces 4b, 4b.

(2-2) The constitution of tire mold 6a associated with the foregoing embodiment is such that third grooves 7e constitute recesses at boundaries between pairs of side surfaces 7b, 7b. However, tire mold 6a is not limited to such constitution. For example, it is also possible to adopt a constitution in which third grooves 7e constitute recesses at locations other than boundaries between pairs of side surfaces 7b, 7b.

(3-1) Furthermore, the constitution of pneumatic tire 1 associated with the foregoing embodiment is such that acute corners 4f, 4h are connected to convexities 4j, 4m by linear projections 4k, 4n. However, pneumatic tire 1 is not limited to such constitution. For example, it is also possible to adopt a constitution in which acute corners 4f, 4h are directly contiguous with linear projections 4k, 4n.

(3-2) Furthermore, the constitution of tire mold 6a associated with the foregoing embodiment is such that acute corners 7f, 7h are connected to vent holes 8a, 8b by grooves 7k, 7n. However, tire mold 6a is not limited to such constitution. For example, it is also possible to adopt a constitution in which acute corners 7f, 7h are directly contiguous with vent holes 8a, 8b.

(4-1) Furthermore, the constitution of pneumatic tire 1 associated with the foregoing embodiment is such that protruding portion 4 comprises convexities 4j, 4m. However, pneumatic tire 1 is not limited to such constitution. For example, it is also possible to adopt a constitution in which protruding portion 4 does not comprise convexities 4j, 4m.

(4-2) The constitution of tire mold 6a associated with the foregoing embodiment is such that it comprises vent holes 8a, 8b. However, tire mold 6a is not limited to such constitution. For example, it is also possible to adopt a constitution in which tire mold 6a does not comprise vent holes 8a, 8b, and in which air internal to tire mold 6a is guided to the exterior of tire mold 6a by way of gaps between molds 6a, 6b.

(5-1) Furthermore, the constitution of pneumatic tire 1 associated with the foregoing embodiment is such that fourth and fifth linear projections 4k, 4n extend in such fashion that together with third linear projection 4e they form what appear to be straight lines. However, pneumatic tire 1 is not limited to such constitution. For example, it is also possible to adopt a constitution in which at least one of fourth and fifth linear projections 4k, 4n extends in such fashion as to be inclined with respect to, and to intersect, third linear projection 4e.

(5-2) Furthermore, the constitution of tire mold 6a associated with the foregoing embodiment is such that fourth and fifth grooves 7k, 7n extend in such fashion as to be collinear with third groove 7e. However, tire mold 6a is not limited to such constitution. For example, it is also possible to adopt a constitution in which at least one of fourth and fifth grooves 7k, 7n extends in such fashion as to be inclined with respect to, and to intersect, third groove 7e.

(6-1) Furthermore, the constitution of pneumatic tire 1 associated with the foregoing embodiment is such that convexities 4j, 4m are contiguous with (or are connected by linear projections 4k, 4n at) corners 4f through 4i. However, pneumatic tire 1 is not limited to such constitution. For example, it is also possible to adopt a constitution in which convexities 4j, 4m are contiguous with (or are connected by linear projections 4k, 4n at) locations other than corners 4f through 4i of linear projections 4c, 4d.

(6-2) Furthermore, the constitution of tire mold 6a associated with the foregoing embodiment is such that vent holes 8a, 8b are contiguous with (or are connected by grooves 7k, 7n at) corners 7f through 7i. However, tire mold 6a is not limited to such constitution. For example, it is also possible to adopt a constitution in which vent holes 8a, 8b are contiguous with (or are connected by grooves 7k, 7n at) locations on grooves 7c, 7d other than corners 7f through 7i.

Figure 8:
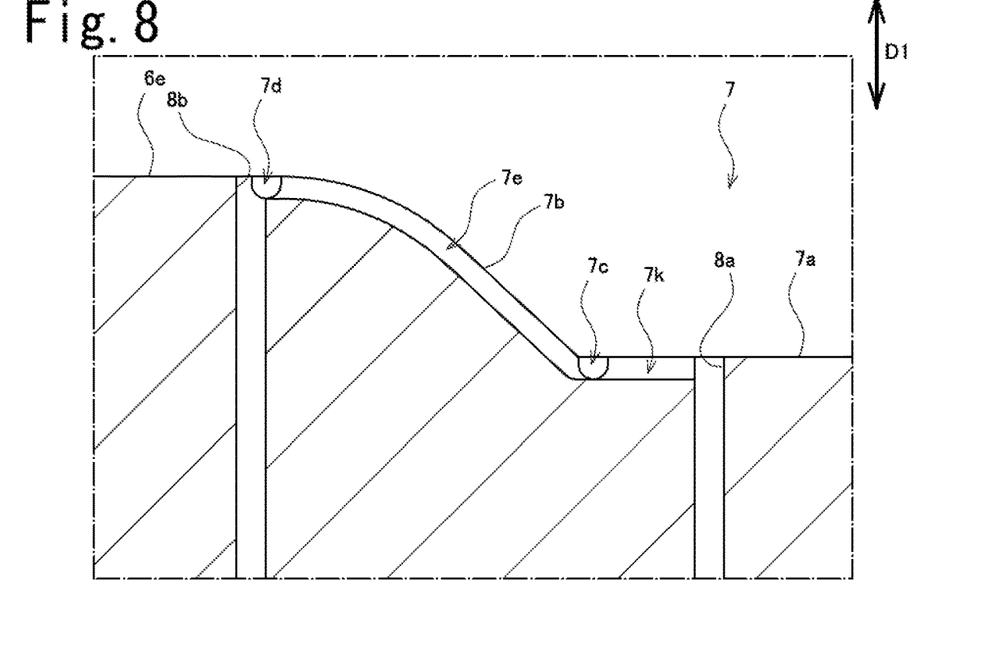
FIG. 8 is an enlarged sectional view of the principal components at a tire mold associated with another embodiment.

(7) Furthermore, the constitution of tire mold 6a associated with the foregoing embodiment is such that it comprises shutoff valves 9 that open and close vent holes 8a, 8b. However, tire mold 6a is not limited to such constitution. For example, as shown in FIG. 8, it is also possible to adopt a constitution in which tire mold 6a is such that at least one of vent holes 8a and 8b does not comprise a shutoff valve 9.

Figure 9:
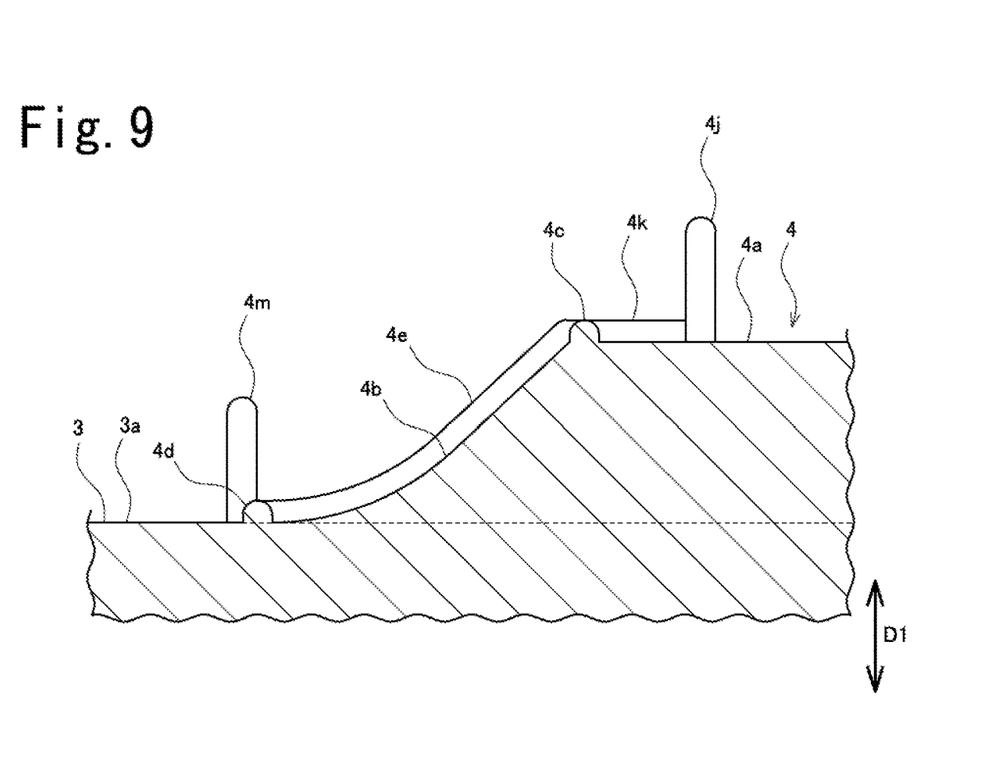
FIG. 9 is an enlarged sectional view of the principal components of a pneumatic tire associated with same embodiment.

At the pneumatic tire 1 which is obtained by molding using such tire mold 6a, convexities 4j, 4m are elongated as shown in FIG. 9. In accordance with such constitution, while there is no particular limitation with respect thereto, the heights by which convexities 4j, 4m protrude from respective surfaces 4a, 3a might, for example, be 5 mm to 15 mm.

The invention claimed is:

1. A pneumatic tire comprising a sidewall region extending in a tire radial direction,
wherein the sidewall region comprises a protruding portion that protrudes in a tire width direction from a base surface,
wherein the protruding portion comprises:
an apical surface which is arranged at an end toward an exterior in the tire width direction;
at least one side surface that is respectively contiguous with the base surface and the apical surface;
a first linear projection which protrudes at a boundary between the apical surface and the at least one side surface;
a second linear projection which protrudes at a boundary between the basal surface and the at least one side surface; and
a third linear projection which protrudes in such fashion that a first end of the third linear projection is contiguous with the first linear projection, and a second end of the third linear projection is contiguous with the second linear projection,
wherein the first linear projection comprises a first corner formed in angular fashion,
wherein the second linear projection comprises a second corner formed in angular fashion,
wherein the at least one side surface is at least one among a plurality of side surfaces, at least one adjacent pair of which are mutually contiguous,
wherein the third linear projection protrudes at a boundary between the at least one adjacent pair of side surfaces so as to cause the first end of the third linear projection to be contiguous with the first corner, and so as to cause the second end of the third linear projection to be contiguous with the second corner,
wherein the protruding portion further comprises:
a first convexity which protrudes from the apical surface; and
a fourth linear projection which protrudes so as to cause a first end of the fourth linear projection to be contiguous with the first convexity, and so as to cause a second end of the fourth linear projection to be contiguous with the first corner, and
wherein the fourth linear projection extends so as to be collinear with the third linear projection.

2. The pneumatic tire according to claim 1 wherein the first corner forms an acute angle.

3. The pneumatic tire according to claim 1 wherein the first corner forms an obtuse angle.

4. The pneumatic tire according to claim 1
wherein the protruding portion comprises a second convexity which protrudes from the base surface, and
wherein a fifth linear projection which protrudes so as to cause a first end of the fifth linear projection to be contiguous with the second convexity, and so as to cause a second end of the fifth linear projection to be contiguous with the second corner.

5. The pneumatic tire according to claim 4 wherein the fifth linear projection extends so as to be collinear with the third linear projection.

6. The pneumatic tire according to claim 5 wherein the second corner forms an acute angle.

7. The pneumatic tire according to claim 5 wherein the second corner forms an obtuse angle.

8. A pneumatic tire comprising a sidewall region extending in a tire radial direction,
wherein the sidewall region comprises a protruding portion that protrudes in a tire width direction from a base surface,
wherein the protruding portion comprises:
an apical surface which is arranged at an end toward an exterior in the tire width direction;
at least one side surface that is respectively contiguous with the base surface and the apical surface;
a first linear projection which protrudes at a boundary between the apical surface and the at least one side surface;
a second linear projection which protrudes at a boundary between the basal surface and the at least one side surface; and
a third linear projection which protrudes in such fashion that a first end of the third linear projection is contiguous with the first linear projection, and a second end of the third linear projection is contiguous with the second linear projection,
wherein the first linear projection comprises a first corner formed in angular fashion,
wherein the second linear projection comprises a second corner formed in angular fashion,
wherein the at least one side surface is at least one among a plurality of side surfaces, at least one adjacent pair of which are mutually contiguous,
wherein the third linear projection protrudes at a boundary between the at least one adjacent pair of side surfaces so as to cause the first end of the third linear projection to be contiguous with the first corner, and so as to cause the second end of the third linear projection to be contiguous with the second corner,
wherein the protruding portion further comprises:
a second convexity which protrudes from the base surface; and
a fifth linear projection which protrudes so as to cause a first end of the fifth linear projection to be contiguous with the second convexity, and so as to cause a second end of the fifth linear projection to be contiguous with the second corner, and
wherein the fifth linear projection extends so as to be collinear with the third linear projection.

9. The pneumatic tire according to claim 8 wherein the second corner forms an acute angle.

10. The pneumatic tire according to claim 8 wherein the second corner forms an obtuse angle.

* * * * *